United States Patent
Shigeyoshi

(10) Patent No.: US 11,878,946 B2
(45) Date of Patent: Jan. 23, 2024

(54) LIQUID CONTACT MEMBER, METHOD FOR PRODUCING SAME, MEMBER FOR ANALYZERS, ANALYZER, SLIDING MEMBER, AND SLIDING DEVICE

(71) Applicant: KYOCERA CORPORATION, Kyoto (JP)

(72) Inventor: Hidekazu Shigeyoshi, Hikone (JP)

(73) Assignee: KYOCERA Corporation, Kyoto (JP)

( * ) Notice: Subject to any disclaimer, the term of this patent is extended or adjusted under 35 U.S.C. 154(b) by 73 days.

(21) Appl. No.: 17/779,053

(22) PCT Filed: Nov. 27, 2020

(86) PCT No.: PCT/JP2020/044360
§ 371 (c)(1),
(2) Date: May 23, 2022

(87) PCT Pub. No.: WO2021/107140
PCT Pub. Date: Jun. 3, 2021

(65) Prior Publication Data
US 2022/0402823 A1 Dec. 22, 2022

(30) Foreign Application Priority Data
Nov. 29, 2019 (JP) .................. 2019-216330

(51) Int. Cl.
*C04B 38/00* (2006.01)
*C04B 35/117* (2006.01)

(52) U.S. Cl.
CPC ........ *C04B 38/0061* (2013.01); *C04B 35/117* (2013.01); *C04B 2235/3206* (2013.01); *C04B 2235/3217* (2013.01); *C04B 2235/3418* (2013.01); *C04B 2235/442* (2013.01);
(Continued)

(58) Field of Classification Search
CPC ............... C04B 38/0061; C04B 35/117; C04B 2235/3206; C04B 2235/3217; C04B 2235/3418; C04B 2235/442; C04B 2235/785; C04B 2235/786; C04B 2235/85; C04B 35/6261; C04B 38/067; C04B 2235/5436; C04B 2235/5445; C04B 2235/75; C04B 2235/963; C04B 35/111;
(Continued)

(56) References Cited

U.S. PATENT DOCUMENTS
2009/0110606 A1 4/2009 Fukushima

FOREIGN PATENT DOCUMENTS
JP 2008-2899 A 1/2008

OTHER PUBLICATIONS
Ernst et al., Structure and Composition of Grain Boundaries in Ceramics, 1999, Journal of the European Ceramics, vol. 19 pp. 665-673. (Year: 1999).*

* cited by examiner

*Primary Examiner* — Cephia D Toomer
(74) *Attorney, Agent, or Firm* — Procopio, Cory, Hargreaves & Savitch LLP

(57) ABSTRACT

Object
To provide a liquid contact member having high hydrophilicity and exhibiting high dirt removal efficiency by cleaning.
Solution
A liquid contact member includes a ceramic including a plurality of crystal grains and a grain boundary phase, and the concentration of silicon on a liquid contact surface of the ceramic is higher than that of silicon on a virtual internal surface parallel to the liquid contact surface.

11 Claims, 5 Drawing Sheets

(a) SECONDARY ELECTRON IMAGE (b) REFLECTION ELECTRON IMAGE

(52) U.S. Cl.
CPC .. *C04B 2235/785* (2013.01); *C04B 2235/786* (2013.01); *C04B 2235/85* (2013.01)

(58) Field of Classification Search
CPC .......... C04B 2235/6567; C04B 2235/72; F16J 15/34; G01N 35/10
See application file for complete search history.

SECONDARY ELECTRON IMAGE

REFLECTION ELECTRON IMAGE (a)

SECONDARY ELECTRON IMAGE (b)

REFLECTION ELECTRON IMAGE

SECONDARY ELECTRON IMAGE

REFLECTION ELECTRON IMAGE (a)

(b)

ical field, a method for producing the same, a member for analyzers, an analyzer, a sliding member, and a sliding device.

LIQUID CONTACT MEMBER, METHOD FOR PRODUCING SAME, MEMBER FOR ANALYZERS, ANALYZER, SLIDING MEMBER, AND SLIDING DEVICE

TECHNICAL FIELD

The present disclosure relates to a liquid contact member having particularly excellent hydrophilicity, a method for producing the same, a member for analyzers, an analyzer, a sliding member, and a sliding device.

BACKGROUND ART

An analyzer for analyzing the components of a sample such as blood dispenses a sample or a reagent by using a dispensing technology in which liquid contained in a syringe is discharged by a predetermined amount through a discharge orifice formed in the syringe by advancing and retreating operations of a plunger.

However, during introduction of liquid immediately after assembling the analyzer or during a repeated dispensing operation, air bubbles may adhere to an inner wall of the syringe containing the liquid or the surface of the plunger that adjusts pressurization and depressurization of the syringe. When a small amount of liquid is dispensed with air bubbles attached, the amount of the liquid varies relatively large and dispensing accuracy decreases.

In order to solve such a problem, PTL 1 proposes a dispenser having a hydrophilic film formed on the inner wall of the syringe or the surface of the plunger. PTL 1 discloses that the hydrophilic film formed on the inner wall of the syringe is, for example, a thin film having a thickness of several Å to several tens of Å and made of a polyvinyl alcohol-based polymer material, and the hydrophilic film formed on the surface of the plunger is a ceramic film such as TiN, BrC4, and DLC.

CITATION LIST

Patent Literature

PTL 1: JP No. 2008-2899 A

SUMMARY

A liquid contact member of the present disclosure includes a ceramic including a plurality of crystal grains and a grain boundary phase, and the concentration of silicon on a liquid contact surface of the ceramic is higher than that of silicon on a virtual internal surface parallel to the liquid contact surface.

A method for producing a liquid contact member of the present disclosure includes: forming a ceramic including a plurality of crystal grains and a grain boundary phase; polishing a surface of the ceramic, the surface serving as a liquid contact surface; and heat-treating the ceramic at a temperature of 1,600° C. to 1,700° C. for a holding time of 1 hour to 4 hours.

A member for analyzers of the present disclosure includes the above liquid contact member. An analyzer of the present disclosure uses the member for analyzers.

A sliding member of the present disclosure includes the above liquid contact member. A sliding device of the present disclosure uses the sliding member.

DESCRIPTION OF EMBODIMENTS

Figure 1:
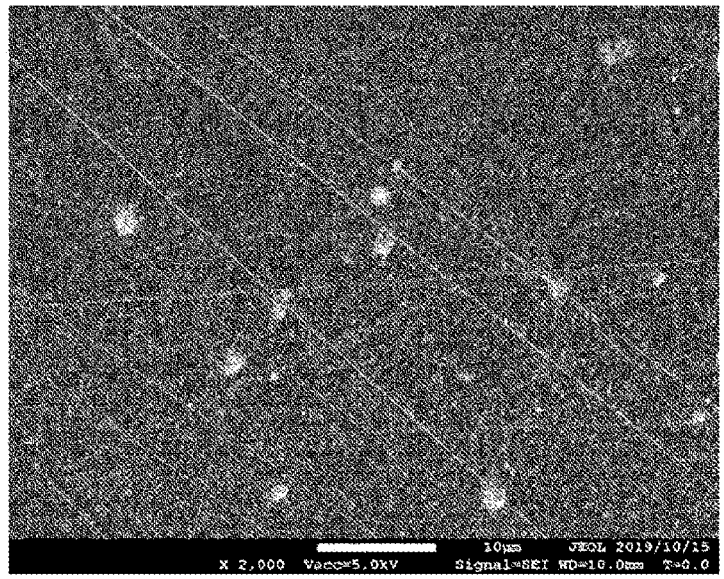
FIG. 1 is a set of scanning electron microscope (hereinafter, SEM) photographs of a liquid contact member in which a liquid contact surface is a mirror surface: (a) is a secondary electron image, and (b) is a reflection electron image.
Figure 1:
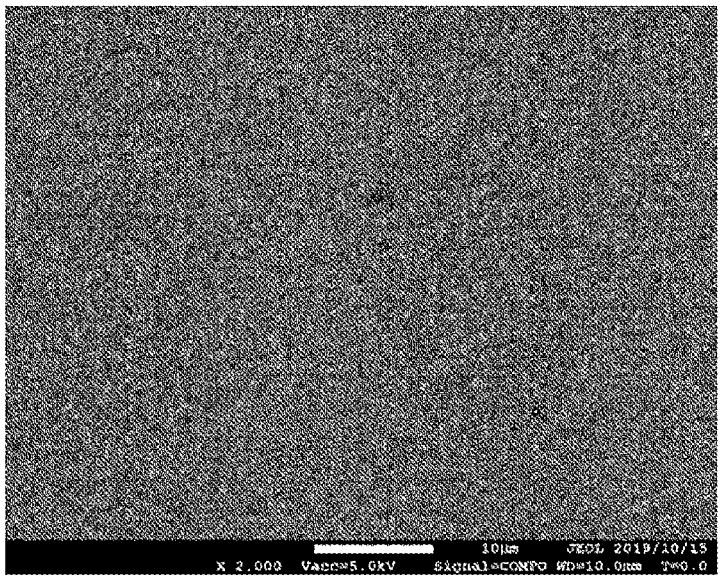

The present embodiment provides a liquid contact member having high hydrophilicity and exhibiting high dirt removal efficiency by cleaning, a method for producing the same, and a member for analyzers, an analyzer, a sliding member, and a sliding device using the above liquid contact member.

Hereinafter, a liquid contact member according to an embodiment of the present disclosure will be described. The liquid contact member of the present disclosure includes a ceramic including a plurality of crystal grains and a grain boundary phase. The concentration of silicon on a liquid contact surface of the ceramic is higher than that of silicon on a virtual internal surface parallel to the liquid contact surface.

Since a contact angle of silicon with respect to pure water is small, the concentration of silicon on the liquid contact surface of the ceramic is higher than that of silicon on the virtual internal surface parallel to the liquid contact surface as described above, which improves hydrophilicity. Therefore, when a water-soluble detergent is used for cleaning, dirt removal efficiency can be increased. At the same time, the concentration of silicon on the virtual surface is lower than that of silicon on the liquid contact surface. With such a configuration, since abnormally grown crystal grains are less likely to be present therein, defects are less likely to occur around them.

The concentration of silicon may be obtained by observing a color mapping image (120 μm in transverse length and 90 μm in longitudinal length) of silicon by using an electron probe microanalyzer (EPMA), targeting a polished cross section including a liquid contact surface. In such a case, the arithmetic mean roughness Ra of the polished cross section is set to 0.01 to 0.2 μm. The arithmetic mean roughness Ra of the cross-section can be obtained in accordance with JIS B 0601: 1994, and it is preferable that the radius of a probe is 5 μm, the material of the probe is diamond, and the measurement length is 1.25 mm, and the cut-off value is 0.25 mm.

The virtual surface refers to a surface having a depth of 20 μm from the liquid contact surface in the cross section and is parallel to the liquid contact surface. For example, the concentration of silicon on the liquid contact surface in the cross section is 50% or more and 80% or less, the concentration of silicon on the virtual surface is 20% or less, and the difference therebetween is preferably 30% or more. The concentration of silicon is the ratio of the total length of points, where silicon is detected on the liquid contact surface and the virtual surface, to the transverse length of the cross section.

The lengths of the points where silicon is detected on the liquid contact surface and the virtual surface may be regarded as equivalent circle diameters obtained by a method called particle analysis using image analysis software "Azo-kun (ver2.52)" (trade name, manufactured by Asahi Kasei Engineering Corporation), and the total length of the points where silicon is detected is preferably the sum of the equivalent circle diameters.

As setting conditions of this method, for example, it is preferable that a threshold value, which is an indicator indicating the contrast of an image, is set to 255, brightness is set to bright, and a small figure removal area is set to 1 $\mu m^2$, and a noise removal filter is set to presence. The threshold value is preferably adjusted according to the brightness of an observation image, and after the brightness is set to bright, a binarization method is set to manual, the small figure removal area is set to 1 $\mu m^2$, and the noise removal filter is set to presence, the threshold value is preferably adjusted in such a manner that a marker appearing in the cross section matches the shape of the point of silicon.

Figure 4:
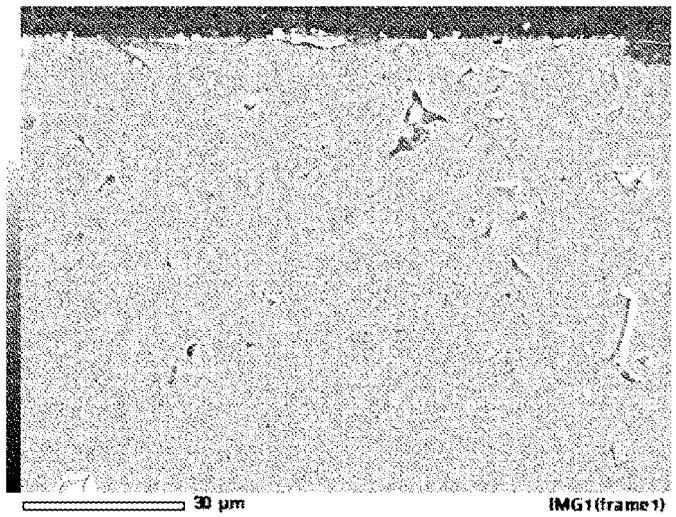
FIG. 4 is a set of (a) a scanning electron microscope photograph of a polished cross-section including a liquid contact surface and (b) a color mapping image of silicon based on (a) by an electron probe microanalyzer (EPMA).
Figure 4:
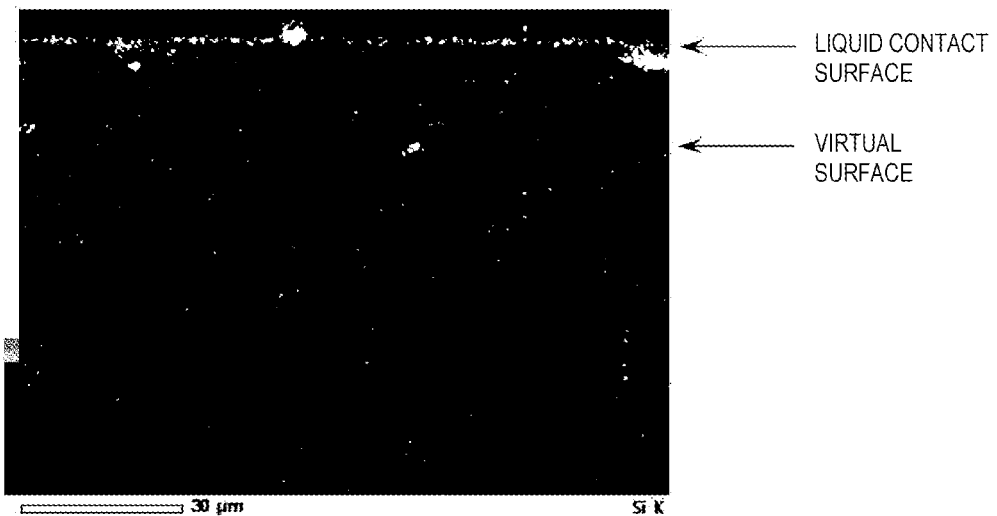

FIG. 4 is a set of (a) a scanning electron microscope photograph of the polished cross-section including the liquid contact surface, and (b) a color mapping image of silicon based on FIG. 4A by an electron probe microanalyzer (EPMA).

When the concentration of silicon is obtained by the aforementioned method, it is found that the concentration of silicon on the liquid contact surface in the cross section illustrated in FIG. 4(b) is 71.2%, the concentration of silicon on the virtual surface is 3.6%, and the concentration of silicon on the liquid contact surface is higher than that of silicon on the virtual surface.

The silicon may be present as an oxide or an element.

The ceramic is not particularly limited as long as it has excellent chemical resistance, and examples of the ceramic include high-purity alumina, zirconia, alumina-zirconia composite materials, and the like.

The high-purity alumina refers to a ceramic having an aluminum oxide content of 99.5 mass % or more in a total of 100 mass % of the components constituting a ceramic, and may include magnesium, silicon, and calcium.

Regarding the content of the components constituting the ceramic, it is preferable that the content of a metal element is obtained using a fluorescent X-ray analyzer or an ICP emission spectroscopic analyzer, and for example, aluminum (Al) is converted into $Al_2O_3$. The constituent components are preferably identified using an X-ray diffractometer.

Furthermore, the ceramic in the liquid contact surface includes a plurality of crystal grains and a grain boundary phase, a width (w) of the grain boundary phase located between the adjacent crystal grains may be 0.7 $\mu m$ to 2.6 $\mu m$, and a ratio (d/w) of a depth (d) of the grain boundary phase to the width (w) of the grain boundary phase may be 0.06 to 0.18. When the width (w) of the grain boundary phase is within the above range and the ratio (d/w) of the depth (d) of the grain boundary phase is 0.06 or more, a contact angle with respect to pure water is reduced, which enables the dirt removal efficiency to be increased when a water-soluble detergent is used for cleaning. When the width (w) of the grain boundary phase is within the above range and the ratio (d/w) of the depth (d) of the grain boundary phase is 0.18 or less, the binding force between the crystal grains due to the grain boundary phase is sufficiently maintained, which reduces the risk of particle shedding even during high-pressure cleaning using a water-soluble detergent.

For the width (w) and the depth (d) of the grain boundary phase, a cross-sectional shape of the liquid contact surface may be obtained by using an atomic force microscope (AFM) after the length of a measurement target is set to 7 $\mu m$ to 20 $\mu m$, and the ratio (d/w) is preferably calculated by using the measured values of the width (w) and the depth (d) of the grain boundary phase.

Furthermore, an average diameter of the crystal grains of the ceramic on the liquid contact surface may be 2 $\mu m$ to 8 $\mu m$. When the average diameter of the crystal grains is within the above range, the contact angle with respect to pure water is further reduced, so the dirt removal efficiency can be increased when a water-soluble detergent is used for cleaning.

The average diameter of the crystal grains of the ceramic can be obtained as follows.

The above polished surface is etched at a temperature of, for example, 1,480° C. until the crystal grains and a grain boundary layer can be distinguished from each other to obtain an observation surface.

Six straight lines having the same length, for example, 30 $\mu m$, radially around a point are drawn in a range of 60 $\mu m \times 44 \mu m$, which is a 2,000-fold magnification of a reflection electron image on the observation surface by using a scanning electron microscope, and the total length of the straight lines is divided by the total number of crystals existing on the straight lines to obtain the average diameter.

Furthermore, the ceramic has closed pores, and a value (A) obtained by subtracting an average value of equivalent circle diameters of the closed pores from the distance between the centroids of the adjacent closed pores may be 20 $\mu m$ to 85 $\mu m$. When the value (A) is 20 $\mu m$ or more, since void portions are dispersed and arranged without being densely arranged, the ceramic has high mechanical properties. When the value (A) is 85 $\mu m$ or less, good processability is obtained when polishing or the like is performed. Moreover, since the distance between the adjacent closed pores is narrowed, the extension of microcracks caused by thermal shock can be restrained.

The distance between the centroids of the closed pores can be obtained by the following method.

First, for example, from the surface to the inside of the above ceramic, the ceramic is polished on a copper disc by using diamond abrasive grains with an average grain size $D_{50}$ of 3 $\mu m$. Thereafter, the ceramic is polished on a tin disc by using diamond abrasive grains with an average grain size $D_{50}$ of 0.5 $\mu m$ to obtain a polished surface. The polishing enables the arithmetic mean roughness Ra of the polished surface to be set to 0.01 $\mu m$ to 0.2 $\mu m$. The arithmetic mean roughness Ra of the polished surface can be obtained in accordance with JIS B 0601: 1994, and it is preferable that the radius of a probe is 5 $\mu m$, the material of the probe is diamond, and the measurement length is 1.25 mm, and the cut-off value is 0.25 mm.

The polished surface is observed at 200-fold magnification and an average range is selected, for example, a range with an area of 0.105 $mm^2$ (374 $\mu m$ in transverse length and 280 $\mu m$ is longitudinal length) is captured by a CCD camera, to obtain an observation image. For this observation image, the distance between the centroids of the closed pores is preferably obtained by a method called the inter-centroid distance method for dispersivity measurement by using the image analysis software "Azo-kun (ver 2.52)" (trade name, manufactured by Asahi Kasei Engineering Corporation). Hereinafter, the term image analysis software "Azo-kun" refers to the image analysis software manufactured by Asahi Kasei Engineering Corporation throughout the description.

As setting conditions of this method, for example, it is preferable that the threshold value, which is an indicator indicating the contrast of an image, is set to 86, the brightness is set to dark, the small figure removal area is set to 1 µm², and the noise removal filter is set to presence. The threshold value may be adjusted according to the brightness of the observation image. After the brightness is set to dark, the binarization method is set to manual, the small figure removal area is set to 1 µm², the noise removal filter is set to presence, and the threshold value is preferably adjusted in such a manner that a marker appearing in the observation image matches the shape of the closed pores.

Particularly, the contact angle of the liquid contact surface with pure water may be 37° or less, and the coefficient of variation may be 0.02 or less. With this, when a water-soluble detergent is used for cleaning, the dirt removal efficiency can be increased and dirt can be restrained from locally remaining.

The contact angle of the liquid contact surface can be obtained in accordance with JIS R 3257: 1999, and is preferably measured at five or more locations by using, for example, a contact angle goniometer (model CA-X, manufactured by Kyowa Interface Science Co., Ltd).

The arithmetic mean height Sa of the liquid contact surface may be 20 nm to 60 nm.

When the arithmetic mean height Sa of the liquid contact surface is 20 nm or more, the contact angle of the liquid contact surface with respect to pure water can be further reduced, which enables the dirt removal efficiency to be increased. When the arithmetic mean height Sa of the liquid contact surface is 60 nm or less, the surface texture is good, significant particle shedding is less likely to occur, and even though such particle shedding occurs, it is less adversely affected due to floating or scattering.

The root mean square height Sq of the liquid contact surface may be 40 nm to 100 nm.

When the root mean square height Sq of the liquid contact surface is 40 nm or more, the contact angle of the liquid contact surface with respect to pure water can be further reduced, which enables the dirt removal efficiency to be increased. When the root mean height Sq of the liquid contact surface is 100 nm or less, the surface texture is good, significant particle shedding is less likely to occur, and even though such particle shedding occurs, it is less adversely affected due to floating or scattering.

Figure 5:
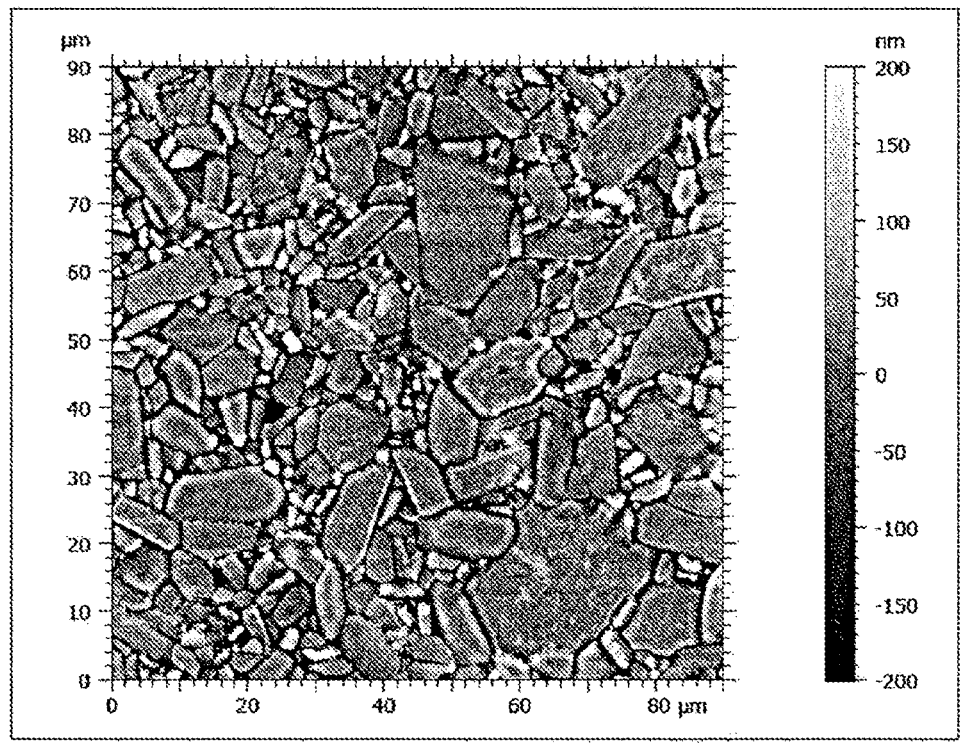
FIG. 5 is a set of (a) a two-dimensional image of a heat-treated liquid contact surface by an atomic force microscope and (b) a three-dimensional image thereof.
Figure 5:
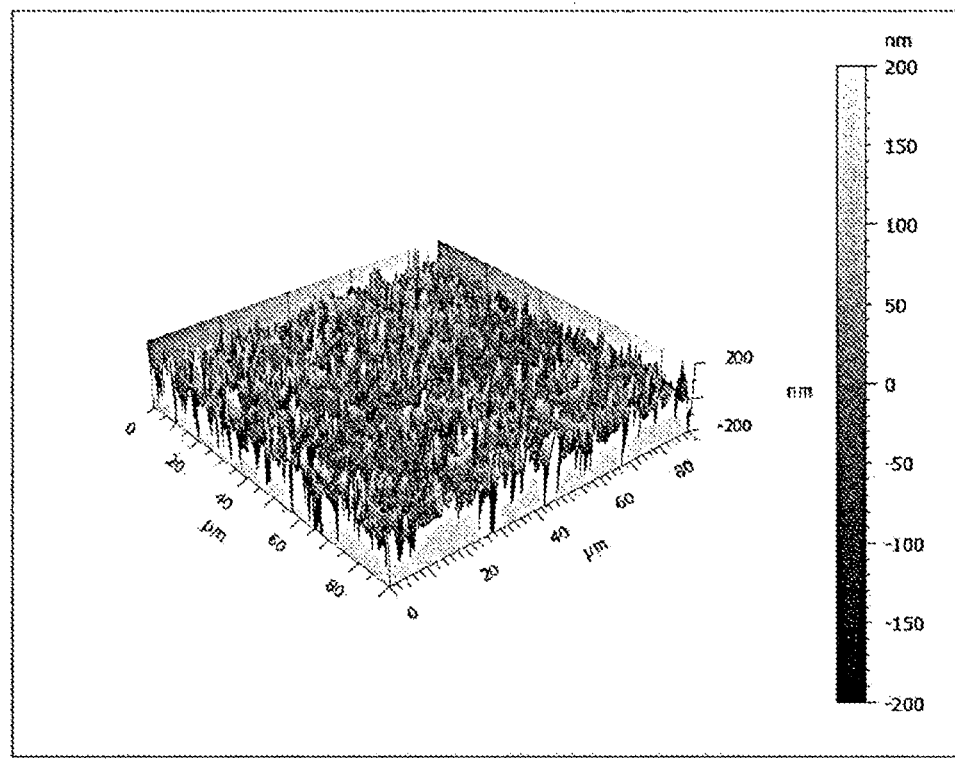

The arithmetic mean height Sa and the root mean square height Sq of the liquid contact surface can be obtained in accordance with ISO 25178, and is preferably obtained by using, for example, an atomic force microscope (AFM) after a measurement range is set to 90 µm. FIG. 5 is a set of (a) a two-dimensional image of a heat-treated liquid contact surface by an atomic force microscope, and (b) a three-dimensional image thereof.

As illustrated in FIG. 5, the arithmetic mean height Sa of the liquid contact surface is 47.1 nm and the root mean square height Sq is 8.9 nm.

Next, a method for producing the liquid contact member of the present disclosure will be described for a case where the liquid contact member includes a high-purity alumina ceramic.

Aluminum oxide powder (purity of 99.9 mass % or more), which is a main component, and each powder of magnesium hydroxide, silicon oxide, and calcium carbonate are put into a pulverizing mill together with a solvent (ion-exchanged water), are pulverized until an average grain size $D_{50}$ of the powders is 1.5 µm or less, and then an organic binder and a dispersing agent for dispersing the aluminum oxide powder are added and mixed to obtain a slurry.

Here, of the total of 100 mass % of the powder described above, the content of magnesium hydroxide powder falls in a range of 0.3 to 0.42 mass %; the content of silicon oxide powder falls in a range of 0.5 to 0.8 mass %; the content of calcium carbonate powder falls in a range of 0.060 to 0.1 mass %; and the remainder includes aluminum oxide powder and inevitable impurities.

Examples of the organic binder include acrylic emulsion, polyvinyl alcohol, polyethylene glycol, polyethylene oxide, and the like.

Next, the slurry is spray-granulated to obtain granules, and then pressurized at a molding pressure from 78 MPa to 128 MPa by using a uniaxial press molding device or a cold isostatic press molding device to obtain a molded body serving as a precursor of the liquid contact member. Then, the molded body is fired at a firing temperature of 1,500° C. to 1,700° C. for a holding time of 4 hours to 6 hours to obtain a ceramic including a plurality of crystal grains and a grain boundary phase.

The surface of the ceramic serving as a liquid contact surface is polished and then heat-treated at a heat treatment temperature in the same range as the above firing temperature to make the concentration of silicon on the liquid contact surface be higher than that of silicon on a virtual internal surface parallel to the liquid contact surface.

After the firing, it may be polished and heat-treated at a temperature of 1,600° C. to 1,700° C., preferably 1,610° C. to 1,690° C. for a holding time of 1 hour to 4 hours. By the polishing and the heat treatment, it is possible to obtain a liquid contact member including a ceramic in which a contact angle of the liquid contact surface with respect to pure water is 37° or less and the coefficient of variation is 0.02 or less. For the polishing, for example, it is preferable that the surface pressure applied to a side surface or an end surface to be polished is set to 0.03 MPa to 0.05 MPa and a lapping machine including diamond abrasive grains having an average grain size of 1 µm to 2 µm and copper is used.

Specifically, the relationship between the ceramic treatment and the contact angle with respect to pure water will be described with reference to test examples. Table 1 below shows the contact angles of a fired surface obtained by firing the aforementioned high-purity alumina molded body, a mirror surface obtained by polishing the fired surface with diamond abrasive grains, and a heat-treated surface obtained by heat-treating the polished surface, and the coefficients of variation thereof.

The contact angles were obtained in accordance with JIS R 3257: 1999, with the number of samples for each item being 5.

Furthermore, for the mirror surface, the fired surface, and the heat-treated surface, the concentration of silicon on the liquid contact surface and the virtual surface was obtained by the aforementioned method and the values thereof are shown in Table 2 below.

TABLE 1

| | Contact angle (°) | | | | | | | |
|---|---|---|---|---|---|---|---|---|
| | Measured value | | | | | | Standard | Coefficient |
| | 1 | 2 | 3 | 4 | 5 | Mean | deviation | of variation |
| Mirror surface | 92.8 | 92.8 | 92.4 | 93.6 | 94.1 | 93.14 | 0.69 | 0.01 |
| Fired surface | 47.1 | 48.9 | 48.1 | 48.3 | 46.5 | 47.78 | 0.97 | 0.02 |
| Heat-treated surface | 33.8 | 32.7 | 32.3 | 33.8 | 32.9 | 33.1 | 0.67 | 0.02 |

TABLE 2

| | Concentration of silicon (%) | |
|---|---|---|
| | Liquid contact surface | Virtual surface |
| Mirror surface | 1 | 2.2 |
| Fired surface | 1.5 | 2.4 |
| Heat-treated surface | 71.2 | 3.6 |

Figure 2:
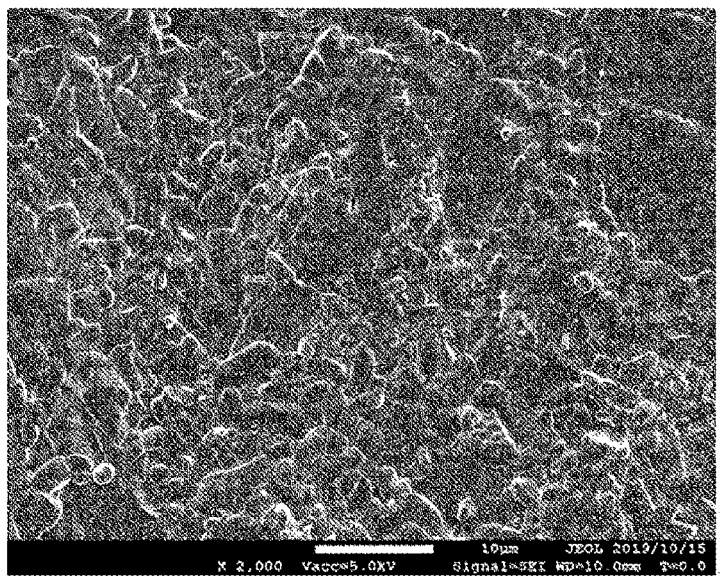
FIG. 2 is a set of scanning electron microscope (hereinafter, SEM) photographs of a liquid contact member in which a liquid contact surface is a fired surface: (a) is a secondary electron image, and (b) is a reflection electron image.
Figure 2:
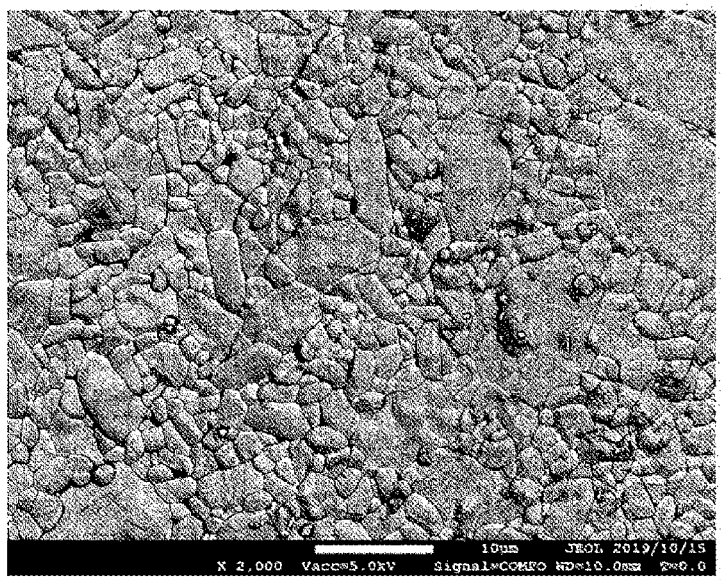
Figure 3:
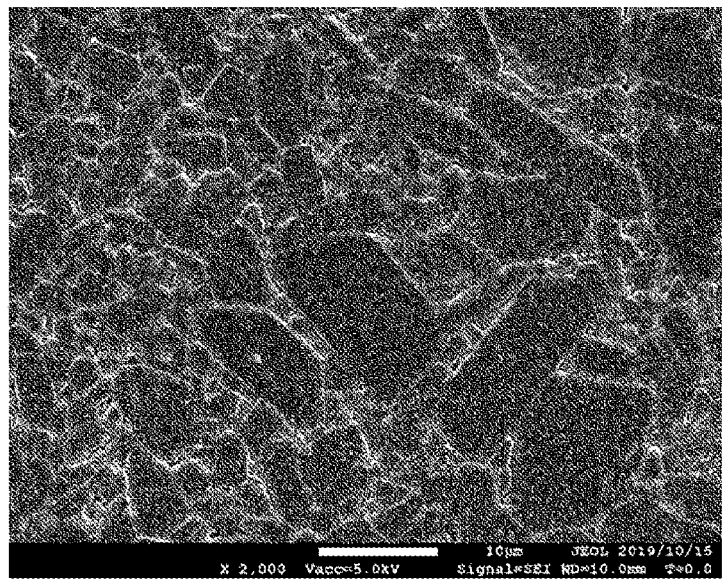
FIG. 3 is a set of scanning electron microscope (hereinafter, SEM) photographs of a liquid contact member in which a liquid contact surface is a heat-treated surface: (a) is a secondary electron image, and (b) is a reflection electron image.
Figure 3:
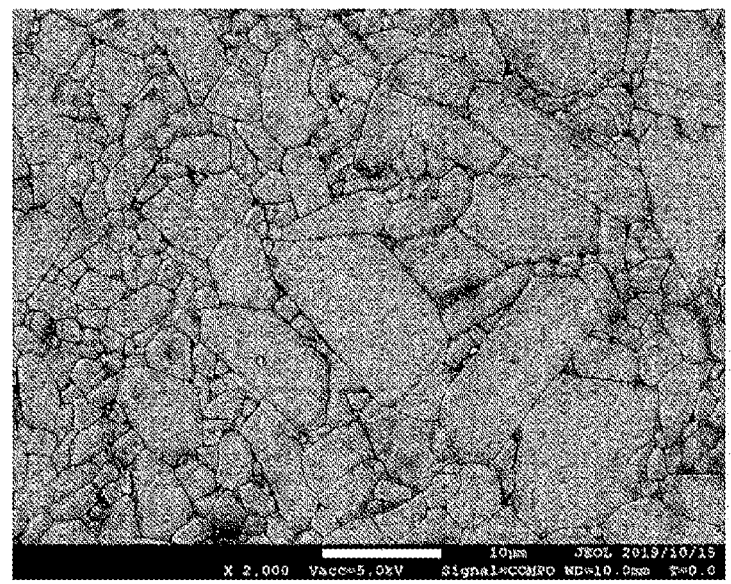

Furthermore, SEM photographs of the mirror surface are presented in FIG. 1, an SEM photograph of the fired surface is presented in FIG. 2, and an SEM photograph of the heat-treated surface is presented in FIG. 3. In FIGS. 1 to 3, A presents a secondary electron image and B presents a reflection electron image.

As is clear from FIGS. 1 to 3, it is found that the heat-treated surface has clearer crystal grains and grain boundary phase than the mirror surface and the fired surface.

As shown in Table 2 above, it can be said that for the mirror surface and the fired surface, the concentration of silicon on the liquid contact surface is lower than that of silicon on the virtual surface, whereas the heat-treated surface has a higher concentration of silicon on the liquid contact surface than that of silicon on the virtual surface and is highly hydrophilic.

The liquid contact member of the present disclosure can be suitably used for, for example, a member including a liquid contact surface of a reaction cell, a sample dispensing nozzle, or the like in an autoanalyzer for medical diagnosis that performs biochemical analysis, immunoassay, or the like as disclosed in Japanese application publication No. 2010-230566.

Furthermore, the liquid contact member of the present disclosure can be suitably used for a member including a liquid contact surface of a syringe, a plunger, or the like in a dispenser that dispenses a small amount of liquid and an analyzer including the dispenser as disclosed in Japanese application publication No. 2008-2899 (PTL 1).

Moreover, the liquid contact member of the present disclosure can also be suitably used for, for example, a water stop valve (Faucet valve) such as a water faucet as disclosed in Japanese application publication No. 10-120460, a mechanical seal ring in a mechanical seal such as a pump for fish preserve and an automobile cooling water pump as disclosed in Japanese Patent No. 5020334, or the like.

The liquid contact surface of the present disclosure preferably has a cutting level difference (Rδc) of 0.3 μm or less on a roughness curve, the cutting level difference representing a difference between a cutting level at a load length ratio of 25% on the roughness curve and a cutting level at a load length ratio of 75% on the roughness curve. With this, the surface texture of the liquid contact surface becomes less uneven, which makes turbulence less likely to occur.

The cut level difference (Rδc) can be measured by using a laser microscope (manufactured by KEYENCE Corporation, ultra-deep color 3D shape measuring microscope (VK-X1000 or successor models thereof)) in accordance with JIS B 0601: 2001. As measurement conditions, it is preferable that an illumination method is set to coaxial illumination, a measurement magnification is set to 480, a cutoff value λs is set to none, a cutoff value λc is set to 0.08 mm, a termination effect correction is set to presence, and a measurement range is set to 710 μm×533 μm. It is preferable that surface roughness is measured by drawing four lines to be measured at substantially equal intervals in the measurement range. The length per line to be measured is 560 μm.

Although the embodiments of the present disclosure have been described above, the present disclosure is not limited to the above embodiments and various changes and improvements can be made within the scope of claims.

The invention claimed is:

1. A liquid contact member comprising:
a ceramic comprising a plurality of crystal grains and a grain boundary phase, wherein
a concentration of silicon on a liquid contact surface of the ceramic is higher than a concentration of silicon on a virtual internal surface parallel to the liquid contact surface.

2. The liquid contact member according to claim 1, wherein a width (w) of the grain boundary phase located between crystal grains adjacent to each other of the plurality of crystal grains is 0.7 μm to 2.6 μm, and a ratio (d/w) of a depth (d) of the grain boundary phase to the width (w) of the grain boundary phase is 0.06 to 0.18.

3. The liquid contact member according to claim 1, wherein an average diameter of the plurality of crystal grains is 2 μm to 8 μm.

4. The liquid contact member according to claim 1, wherein the ceramic has closed pores, and a value (A) obtained by subtracting an average value of equivalent circle diameters of the closed pores from an average value of distances between centroids of the adjacent closed pores is 20 μm to 85 μm.

5. The liquid contact member according to claim 1, wherein an arithmetic mean height Sa of the liquid contact surface is 20 nm to 80 nm.

6. The liquid contact member according to claim 1, wherein a root mean square height Sq of the liquid contact surface is 40 nm to 100 nm.

7. A method for producing the liquid contact member according to claim 1, the method comprising:
forming a ceramic comprising a plurality of crystal grains and a grain boundary phase;
polishing a surface of the ceramic, the surface serving as a liquid contact surface; and
heat-treating the ceramic at a temperature of 1,600° C. to 1,700° C. for a holding time of 1 hour to 4 hours.

8. A member for analyzers, comprising:
the liquid contact member according to claim 1.

9. An analyzer comprising and using the member for analyzers according to claim 8.

10. A sliding member comprising:
the liquid contact member according to claim 1.

11. A sliding device comprising and using the sliding member according to claim 10.

* * * * *